2,813,855

TETRAKISAZO DYESTUFFS AND PROCESSES FOR THEIR PRODUCTION

Werner Bossard, Riehen near Basel, Switzerland, and Paul Dussy, St-Louis, France, assignors to J. R. Geigy A.-G., Basel, Switzerland, a Swiss firm No Drawing. Application May 7, 1956,
Serial No. 582,929

Claims priority, application Switzerland May 17, 1955

8 Claims. (Cl. 260—166)

The invention concerns tetrakisazo dyestuffs which are suitable for the fast to light dyeing of cellulose fibres in yellow, orange to brown shades. The dyeings can be discharged well. It also concerns processes for the production of these new tetrakisazo dyestuffs as well as their use for the attainment of fast yellow, orange to brown cellulose dyeings and also, as industrial product, the material fast dyed with the aid of these dyestuffs.

It has been found that very valuable polyazo dyestuffs are obtained by condensing two identical or different molecules of aminodisazo dyestuff of the general Formula I

$$R_1-N=N-R_2-N=N-R_3-NH_2 \quad (I)$$

with a benzene p-dicarboxylic acid halide to form the tetrakisazo dyestuff of the general formula II:

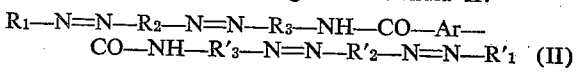

$$R_1-N=N-R_2-N=N-R_3-NH-CO-Ar-$$
$$CO-NH-R'_3-N=N-R'_2-N=N-R'_1 \quad (II)$$

In these formulae:

$R_1$ represents a radical of the benzene or naphthalene series, $R_2$ represents a radical of the benzene or naphthalene series in which the azo linkages are in the p-position to each other, $R_3$ represents a radical of the benzene series in which the amino or acylamino group and the azo group are in the p-position to each other, and Ar represents a p-phenylene radical.

In Formula I, at least one of the symbols $R_2$ and $R_3$ represents the radical of a 3-acylamino-1-aminobenzene coupling component and the radicals $R_1$ and $R_2$ contain together at least two and at most three acid salt forming, water solubilising groups, for example sulphonic acid or carboxyl groups.

Amino disazo dyestuffs of the Formula I which are usable according to the present invention are obtained for example from diazotised aminobenzene and aminonaphthalene sulphonic and carboxylic acids by coupling with an azo component of the benzene or naphthalene series coupling in the p-position to a primary amino group. The diazotised aminobenzene and aminonaphthalene sulphonic and carboxylic acids mentioned above may contain one or two acid salt forming groups, and possibly a hydroxyl group in the o-position to a carboxyl group. Further admissible substituents are for example halogen, alkyl, alkoxy, acylamino, alkyl or aryl sulphonyl or sulphonic acid amide groups. In the above mentioned coupling, the use of a coupling component of the benzene series and in particular a 1-amino-3-acylaminobenzene compound in this step is advantageous for the properties of the end product. Instead of the aminoazo dyestuffs obtained in this manner, also p-aminobenzene sulphonic acids can be used. These are obtained for example by sulphonating the basic compound or by coupling diazotised 4-nitro-1-amino or 4-acylamino-1-amino benzene or naphthalene sulphonic acids with 2-hydroxybenzene-1-carboxylic acids after converting the nitro or acylamino group into the primary amino group.

These p-aminoazo dyestuffs are further diazotised and coupled with azo components of the benzene series which couple in the p-position to a primary amino group, which advantageously do not contain any acid salt forming groups, e. g. 1-aminobenzene, 2- or 3-methyl-, 2.5-dimethyl-, 2-methoxy-5-methyl-1-aminobenzene, or with a 3-acylamino-1-aminobenzene. If unsulphonated derivatives of the benzene and naphthalene series are used as first and second middle components corresponding to $R_2$ and $R_3$, the starting component must contain at least two acid water solubilising groups preferably two sulphonic acid groups. In this case, aminobenzene and aminonaphthalene disulphonic acids are to be preferred as starting components. Also, possibly acid water solubilising groups can be in the acyl radical of the 3-acylamino-1-aminobenzene component present according to the definition. This acyl radical can be derived from aliphatic dicarboxylic acids such as for example oxalic acid or succinic acid or from sulphonated fatty acids. Usually the radicals of low fatty acids or carbonic acid monoalkylester radicals form the acyl radical of this component.

Advantageously the condensation of the aminodisazo dyestuffs with the benzene-p-dicarboxylic acid halides is performed with the aqueous solution of their alkali salts at 10–60° in the presence or with the gradual addition of agents which buffer or neutralise the mineral acid such as sodium acetate, di- or tri-sodium phosphate, sodium carbonate, caustic soda lye and magnesium oxide. Energetic stirring of the dyestuff solution is recommended. Possibly the presence of an organic solvent and acid binding agent to accelerate the condensation may be necessary, for example, pyridine or similar water soluble tertiary nitrogen bases. The benzene-p-dicarboxylic acid halides used may possibly also contain further inert substituents, for example halogen, alkyl or alkoxy groups.

The tetrakisazo dyestuffs according to the present invention can be isolated in a pure form, possibly after removal of the organic solvent with steam. They are easily obtained in the form of the alkali salts by carefully salting out, any unchanged or unreacted acylated starting dyestuff being retained in solution.

In the form of their alkali salts, for example the lithium, sodium, potassium or ammonium salts, the new tetrakisazo dyestuffs are yellow to brown powders which dissolve well in water. According to the composition they draw well or very well onto cellulose fibres from an aqueous solution under the usual dyeing conditions in the presence of Glauber's salt. The yellow, orange to brown cellulose dyeings obtained therewith are distinguished by their very good fastness to light and they can be discharged well.

The following examples illustrate the invention without limiting it in any way. Where not otherwise stated, parts are given as parts by weight and the temperatures in degrees centigrade. The relationship of parts by weight to parts by volume is as that of kilograms to litres.

EXAMPLE 1

116.4 parts of the amino disazo dyestuff obtained by coupling diazotised 2-aminonaphthalene-6.8-disulphonic acid with 1-amino-3-methylbenzene, further diazotisation of the amino disazo dyestuff obtained and coupling with 1-amino-3-acetylaminobenzene, are dissolved at 60° in a neutral medium with the addition of sodium carbonate. After cooling to 20°, a solution of 22.4 parts of benzene- 1.4-dicarboxylic acid dichloride in 200 parts of acetone and an aqueous solution of sodium carbonate are added dropwise in such a manner that the reaction mixture always has a neutral reaction. As soon as no more free amine can be traced, the tetrakisazo dyestuff formed is precipitated by the addition of sodium chloride, filtered off, washed with diluted sodium chloride solution and dried. It is a brown powder which dissolves in water with a yellow-orange colour. It dyes natural or regenerated cellulose fibres in yellow-brown shades. The dyeings have very good fastness to light and can be discharged white.

The free acid of the new dyestuff corresponds to the formula:

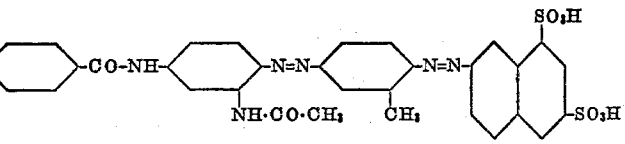

It dissolves in concentrated sulphuric acid with a blue colour which after some time changes to brown-red.

If in the above example, the components for the formation of the aminoazo dyestuff are changed according to the following table, then dyestuffs are obtained which have similar properties.

EXAMPLE 2

112.4 parts of the aminodisazo dyestuff of the formula:

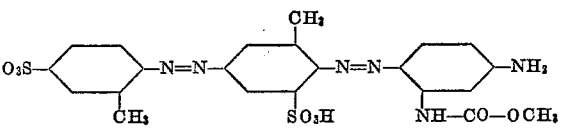

are dissolved with a neutral reaction in 1500 parts of water with the addition of sodium hydroxide. 22.4 parts of benzene-1.4-dicarboxylic acid dichloride dissolved in 200 parts of acetone are slowly added dropwise at 40–45°. The hydrochloric acid which is split off during the reaction is continuously neutralised by the simultaneous addition dropwise of caustic soda lye. As soon as no more aminodisazo dyestuff can be traced, the tetrakisazo dyestuff formed is precipitated by the addition of sodium chloride, filtered off, washed with diluted sodium chloride solution and dried.

Table

| Dyestuff No. | Starting component | 1st middle component | 2nd middle component | acylating agent | shade on cotton | colour aqueous solution | colour of powder |
|---|---|---|---|---|---|---|---|
| 1 | 2-aminonophthalene-6.8-disulphonic acid. | 1-amino-3-methylbenzene. | 1-amino-3-carbomethoxy-aminobenzene. | benzene-1.4-dicarboxylic acid dichloride. | yellow-orange. | orange | brown. |
| 2 | 1-aminonaphthalene-3.6-disulphonic acid. | ___do___ | 1-amino-3-acetylamino-benzene. | ___do___ | ___do___ | ___do___ | Do. |
| 3 | ___do___ | 1-amino-2-methyl-5-acetyl amino-benzene. | 1-amino-benzene | ___do___ | orange | ___do___ | red. |
| 4 | 1-aminonaphthalene-3.8-disulphonic acid. | 1-amino-3-acetylamino-benzene. | 1-amino-3-acetlyamino-benzene. | ___do___ | ___do___ | red | brown. |
| 5 | 2-aminonaphthalene-4.8-disulphonic acid. | 1-amino-3-carbomethoxy-aminobenzene. | 1-amino-3-methylbenzene. | 2.5-dimethyl-benzene-1.4-dicarboxylic acid dichloride. | ___do___ | red-orange | Do. |
| 6 | ___do___ | 1-amino-3-butyroyl-aminobenzene. | 1-amino-benzene | benzene-1.4-dicarboxylic acid dichloride. | yellow-orange. | orange | red. |
| 7 | ___do___ | 1-amino-2-methoxyl-5-methylbenzene. | 1-amino-3-formyl-aminobenzene. | ___do___ | orange-red. | orange-red. | red-brown. |
| 8 | 2-aminonaphthalene-5.7-disulphonic acid. | 1-amino-2.5-dimethylbenzene. | 1-amino-3 carbometh-oxyamino-benzene. | 2.5-dimethozy-benzene-1.4-dicarboxylic acid dichloride. | red | brown-red | brown. |
| 9 | ___do___ | 1-amino-3-carbomethoxy-aminobenzene. | ___do___ | benzene-1.4-dicarboxylic acid dichloride. | orange-red | ___do___ | Do. |
| 10 | ___do___ | 1-amino-3-sulphoacetyl-aminobenzene. | 1-amino-3-methoxybenzene. | 2.5-dichloroben-zene-1.4-dicarboxylic acid dichloride. | orange | red | red-brown. |
| 11 | 2-aminonaphthalene-3.6-disulphonic acid. | 1-amino-3-oxalylaminobenzene. | 1-amino-2-methoxy-5-methylbenzene. | benzene-1.4-dicarboxylic acid dichloride. | ___do___ | ___do___ | violet-brown. |
| 12 | ___do___ | 1-amino-2-methoxy-5-acetylaminobenzene. | 1-amino-3-methyl-benzene. | ___do___ | red-orange | ___do___ | brown. |
| 13 | 2-aminonaphthalene-5.7-disulphonic acid. | 1-amino-3-methylbenzene. | 1-amino-3-carbethoxyamino-benzene. | ___do___ | orange | orange | Do. |
| 14 | 2-aminonaphthalene-3.6-disulphonic acid. | ___do___ | ___do___ | ___do___ | ___do___ | red | red-brown. |
| 15 | 2-aminonaphthalene-6.8-disulphonic acid. | 1-amino-2-methoxy-5-methyl-benzene. | 1-amino-3-carbometh-oxyamino-benzene. | ___do___ | ___do___ | ___do___ | Do. |

In the free form, the new dyestuff corresponds to the formula:

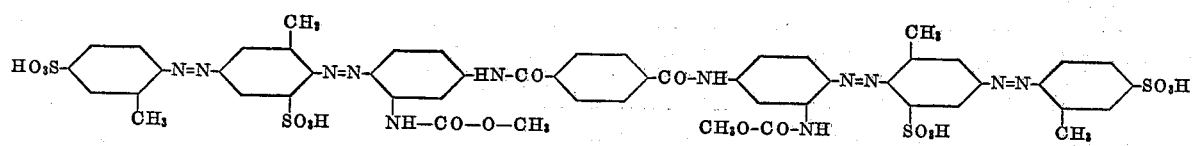

It is a brown-red powder which dissolves in water with an orange red colour. The colour of the solution in concentrated sulphuric acid is blue at first but quickly changes to brown-olive. Dyed onto cotton or regenerated cellulose fibres, pure orange shades are obtained. The dyeings are very fast to light and can be discharged white.

If the 112.4 parts of aminodisazo dyestuff in the above example are replaced by the corresponding number of parts of one of the aminodisazo dyestuffs given in the following table, then dyestuffs are obtained which have similar properties.

aqueous solution of sodium carbonate are so added dropwise simultaneously at 10–15° that the reaction mixture always has a neutral reaction. On completion of the dropwise addition, the whole is stirred until no more aminodisazo dyestuff can be traced. The new tetrakisazo dyestuff obtained of the formula:

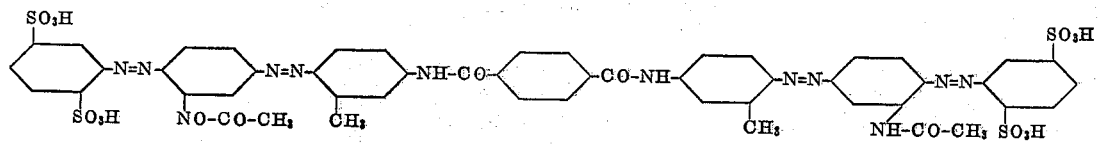

is precipitated by the addition of sodium chloride, filtered off and washed with diluted sodium chloride solution and dried. It is a brown powder which dissolves in water with an orange-red and in concentrated sulphuric acid with a blue colour. Cellulose fibres are dyed in fast to light reddish yellow shades which can be discharged white.

If instead of the aminodisazo dyestuff having the composition 1-aminobenzene-2.5-disulphonic acid→1-amino-3-acetylaminobenzene→1-amino-3-methylbenzene, one of the combinations given in the following table is condensed with a benzene-1.4-dicarboxylic acid dichloride according to the above example, then dyestuffs are obtained which have similar properties.

| Dyestuff No. | Aminodisazo dyestuff | Acylating agent | Shade on cotton | Colour aqueous solution | Colour of powder |
|---|---|---|---|---|---|
| 1 | HO₃S—⟨⟩—N=N—⟨⟩(SO₃H)—N=N—⟨⟩(NH—CO—CH₃)—NH₂ | benzene-1.4-dicarboxylic acid dichloride. | orange | red orange | red brown. |
| 2 | HO₃S—⟨⟩—N=N—⟨⟩(SO₃H)—N=N—⟨⟩(NH-CO-O-C₂H₄-O-CH₃)—NH₂ | do | do | do | brown. |
| 3 | HO₃S—⟨⟩—N=N—⟨⟩(SO₃H)—N=N—⟨⟩(NH—CO—O—C₂H₅)—NH₂ | do | do | red | red brown. |
| 4 | HO—⟨⟩(SO₃H)(COOH)—N=N—⟨⟩(CH₃)—N=N—⟨⟩(NH—CO—O—CH₃)—NH₂ | do | do | red orange | brown. |
| 5 | HO—⟨⟩(SO₃H)(COOH)—N=N—⟨⟩(CH₃)(O—CH₃)—N=N—⟨⟩(NH—CO—O—CH₃)—NH₂ | do | red orange | red | Do. |
| 6 | HO₃S—⟨⟩(CH₃)—N=N—⟨⟩(CH₃)(SO₃H)—N=N—⟨⟩(NH-CO-O-C₂H₄-O-CH₃)—NH₂ | do | do | do | Do. |

EXAMPLE 3

106.4 parts of the aminodisazo dyestuff 1-aminobenzene-2.5-disulphonic acid→1-amino-3-acetylaminobenzene→1-amino-3-methylbenzene are dissolved with a neutral reaction in 1500 parts of water with the addition of sodium carbonate. A solution of 22.4 parts of benzene-1.4-dicarboxylic acid dichloride in 200 parts of acetone and an

Table

| Dyestuff No. | Starting component | 1st middle component | 2nd middle component | acylating agent | shade on cotton | colour aqueous solution | colour of powder |
|---|---|---|---|---|---|---|---|
| 1 | 1-aminobenzene-2.5-disulphonic acid. | 1-amino-3-methyl-benzene. | 1-amino-3-acetyl-aminobenzene. | benzene-1.4-dicarboxylic acid dichloride. | yellow-orange. | orange. | red. |
| 2 | ....do.... | 1-amino-3-formyl-aminobenzene. | ....do.... | ....do.... | orange. | red. | red-brown. |
| 3 | ....do.... | 1-amino-3-carbomethoxyamino-benzene. | 1-aminobenzene. | ....do.... | yellow-orange. | orange. | red. |
| 4 | ....do.... | 1-amino-2-methoxy-5-acetylamino-benzene. | 1-amino-3-methyl-benzene. | ....do.... | orange. | red. | red-brown. |
| 5 | 1-aminobenzene-4-sulphonic acid. | 1-aminonaphthalene-7-sulphonic acid. | 1-amino-3-acetyl-aminobenzene. | ....do.... | red-brown. | brown-red. | brown. |
| 6 | 1-aminobenzene-3-sulphonic acid. | 1-amino-3-sulpho-acetyl-amino-benzene. | 1-amino-3-methyl-benzene. | ....do.... | yellow-orange. | orange. | red. |
| 7 | ....do.... | 1-amino-3-oxalyl-aminobenzene. | 1-aminobenzene. | 2.5-dimethylbenzene-1.4-dicarboxylic acid dichloride. | orange. | red. | brown. |
| 8 | 1-amino-2.4-dimethylbenzene-6-sulphonic acid. | ....do.... | 1-amino-2-methoxy-5-methylbenzene. | 2.5-dichlorobenzene-1.4-dicarboxylic acid dichloride. | red-orange. | ....do.... | brown-violet. |
| 9 | 1-aminobenzene-3-carboxylic acid. | ....do.... | 1-amino-3-methyl-benzene. | benzene-1.4-dicarboxylic acid dichloride. | reddish yellow. | orange. | red-brown. |
| 10 | 1-amino-4-nitrobenzene-3-carboxylic acid. | 1-amino-3-sulpho-acetylamino-benzene. | 1-aminobenzene. | ....do.... | red-orange. | red. | brown-violet. |
| 11 | 1-aminobenzene-2-carboxylic acid-4-sulphonic acid. | 1-amino-3-acetyl-aminobenzene. | 1-amino-2-methyl-benzene. | ....do.... | reddish yellow. | orange. | red-orange. |
| 12 | ....do.... | 1-amino-2-methoxy-5-acetyl-aminobenzene. | 1-aminobenzene. | ....do.... | orange. | red. | brown. |
| 13 | 1-aminobenzene-3-sulphonic acid. | 1-amino-3-methyl-benzene. | 1-amino-3-carbomethoxyethyl-aminobenzene. | ....do.... | yellow orange. | orange. | red. |
| 14 | 1-aminobenzene-2,5-disulphonic acid. | 1-amino-3-acetyl-aminobenzene. | 1-amino-2-methoxy-5-methylbenzene. | ....do.... | red-orange. | red. | red-brown. |
| 15 | 1-aminobenzene-4-sulphonic acid. | 1-aminonaphthalene-6-sulphonic acid. | 1-amino-3-acetyl-aminobenzene. | ....do.... | blueish red. | ....do.... | brown. |
| 16 | 1-aminobenzene-3-sulphonic acid. | ....do.... | 1-amino-3-carbomethoxyamino-benzene. | ....do.... | red. | ....do.... | Do. |
| 17 | 1-aminobenzene-2.5-disulphonic acid. | 1-aminonaphthalene. | 1-amino-3-acetyl-aminobenzene. | ....do.... | yellowish red. | ....do.... | red-brown. |
| 18 | ....do.... | ....do.... | 1-amino-3-carboethoxy-amino-benzene. | ....do.... | ....do.... | ....do.... | Do. |
| 19 | ....do.... | 1-amino-3-formyl-aminobenzene. | 1-amino-3-acetyl-aminobenzene. | 2.5-dimethoxy-benzene-1.4-dicarboxylic acid dichloride. | orange. | ....do.... | Do. |

EXAMPLE 4

58.2 parts of the aminodisazo dyestuff of the formula:

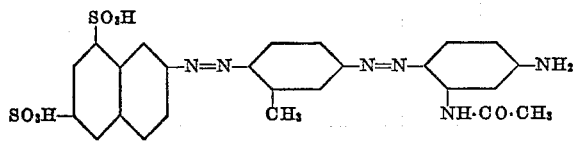

and 53.2 parts of the aminodisazo dyestuff of the formula:

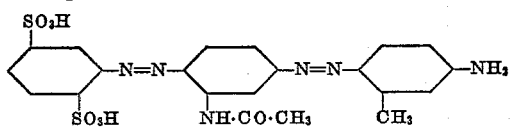

are dissolved with a neutral reaction in 1800 parts of water with sodium carbonate. 22.4 parts of benzene-1.4-dicarboxylic acid dischloride dissolved in 200 parts of acetone and an aqueous solution of sodium carbonate are so added dropwise simultaneously within one hour at 20–25° that the reaction mixture always has a neutral reaction. When no free amino group can any longer be traced, the new tetrakisazo dyestuff of the probable formula:

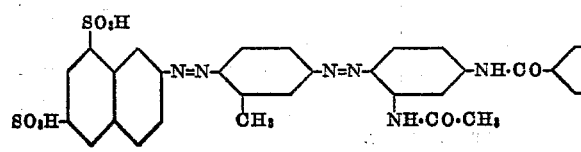

is precipitated by the addition of sodium chloride, filtered and washed with diluted sodium chloride solution. It dissolves in water with an orange colour and in concentrated sulphuric acid with a greenish-blue colour. It dyes natural or regenerated cellulose fibres in pure yellow-orange shades which are very fast to light and can be discharged white.

Further similar dyestuffs are obtained if in the above example, the 58.2 parts of the aminodisazo dyestuff of the formula:

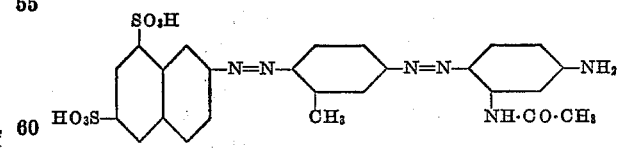

are replaced by the equivalent number of parts of one of the dyestuffs given in the table at the end of Example 1.

EXAMPLE 5

1.0 part of the dyestuff obtained according to Example 1 is dissolved in a dyebath containing 3000 parts of water and 3 parts of soda. 100 parts of cotton are entered at 45–50°, the bath is heated to 90–95° within 30 minutes, 45 parts of sodium sulphate are added and dyeing is continued for 60 minutes at this temperature. The goods are then rinsed in cold water and dried in the usual way. The cotton is dyed in yellow-orange shades which have very good fastness to light.

What we claim is:

1. A tetrakisazo dyestuff having the general formula:

$R_1$—N=N—$R_2$—N=N—$R_3$—NH—CO—Ar—CO—NH—$R'_3$—N=N—$R'_2$—N=N—$R'_1$ wherein $R_1$ and $R'_1$ each represent an aromatic radical containing at least one six-membered carbocyclic nucleus and at most two such nuclei condensed with one another, $R_2$ and $R'_2$ each represent an aromatic radical containing at least one six-membered carbocyclic nucleus and at most two such nuclei condensed with one another containing the azo groups in p-position to each other, $R_3$ and $R'_3$ each represent a mononuclear radical of the benzene series in which the bonds shown stand in the p-position to each other, Ar represents a mononuclear radical of the benzene series containing the —CO— groups in p-position whereby of $R_2$ and $R_3$ and $R'_2$ and $R'_3$, at least one symbol in each group represents a 1,4-phenylene-2-acylamino radical and each of the radicals $R_1$ and $R_2$ and $R'_1$ and $R'_2$ together contain at least two and at most three acid water solubilising groups.

2. A tetrakisazo dyestuff having the general formula:

$R_1$-N=N-$R_2$-N=N-$R_3$-NH-CO-Ar-CO-NH-$R_3$-N=N-$R_2$-N=N-$R_1$
  |           |                               |           |
  $X_1$       $X_2$                           $X_2$       $X_1$ wherein:

$R_1$ represents an aromatic radical containing at least one six-membered carbocyclic nucleus and at most two such nuclei condensed with one another, $R_2$ represents a mononuclear radical of the benzene series containing the azo groups in p-position to each other and containing $X_1$ in o-position to the azo group connecting $R_1$ and $R_2$, $R_3$ represents a mononuclear radical of the benzene series containing the groups —N=N— and —NH— bound thereto in p-position to each other and $X_2$ in o-position to the —N=N— group mentioned, Ar represents a mononuclear radical of the benzene series containing the —CO— groups in the p-position, of $X_1$ and $X_2$, at least one X represents an acylamino group and whereby the radicals $R_1$ and $R_2$ together contain at least two and at most three acid water solubilising groups.

3. A tetrakisazo dyestuff having the general formula:

$HO_3S$—A—N=N—[ring: $Y_1$, $X_1$, Z]—N=N—[ring: $Y_2$, $X_2$]—NH—CO—[ring: V]—CO—NH—[ring: V]—[ring: $Y_2$, $X_2$]—N=N—[ring: Z, $X_1$]—N=N—A—$SO_3H$ wherein:

A represents a member selected from the group consisting of phenyl and naphthyl radicals, of $X_1$ and $X_2$, one X represents an acylamino group and the other X represents a member selected from the group consisting of hydrogen, the acylamino and methyl group, of $Y_1$ and $Y_2$, one Y represents the $SO_3H$ group and the other Y represents hydrogen, and Z and V each represent a member selected from the group consisting of hydrogen, the methyl and the methoxy group.

4. A tetrakisazo dyestuff having the formula

[Structure: benzene ring with $SO_3H$, $SO_3H$—N=N—benzene(NH-CO-CH₃)—N=N—benzene($CH_3$, $OCH_3$)—NH-CO—benzene—CO-NH—benzene($CH_3$, $OCH_3$)—N=N—benzene(NH-CO-CH₃)—N=N—benzene($SO_3H$, $SO_3H$)]

5. A tetrakisazo dyestuff having the formula

[Structure: benzene($SO_3H$, $SO_3H$)—N=N—benzene(NH-CO-CH₃)—N=N—benzene($CH_3$)—NH-CO—benzene—CO-NH—benzene($CH_3$)—N=N—benzene(NH-CO-CH₃)—N=N—benzene($SO_3H$)]

6. A tetrakisazo dyestuff having the formula

[Structure: $SO_3H$—benzene—N=N—benzene($SO_3H$)—N=N—benzene(NH-CO-CH₃)—NH-CO—benzene—CO-NH—benzene($SO_3H$, NH-CO-CH₃)—N=N—benzene—N=N—benzene—$SO_3H$]

7. A tetrakisazo dyestuff having the formula

[Structure: naphthalene($SO_3H$, $SO_3H$)—N=N—benzene($CH_3$, $OCH_3$)—N=N—benzene(NH-CO-O-CH₃)—NH-CO—benzene—CO-NH—benzene(NH-CO-O-CH₃)—N=N—benzene($CH_3$, $OCH_3$)—N=N—naphthalene($SO_3H$, $SO_3H$)]

8. A tetrakisazo dyestuff having the formula
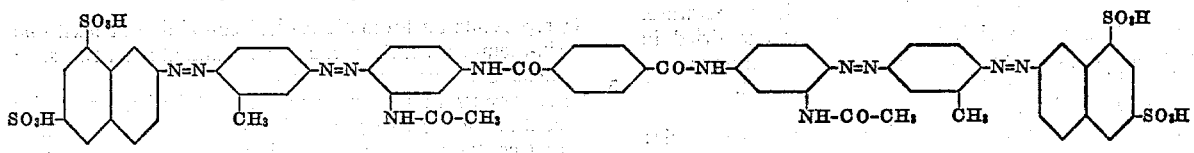
References Cited in the file of this patent
UNITED STATES PATENTS
1,913,383   Gubelmann et al. -------- June 13, 1933
2,746,954   Grandjean et al. --------- May 22, 1956